FIG. I

INVENTOR
W. T. WINTRINGHAM
BY Hugh S. Wertz
ATTORNEY

INVENTOR
W. T. WINTRINGHAM
BY
Hugh S. Wertz
ATTORNEY

INVENTOR
W. T. WINTRINGHAM
BY
Hugh S. Wertz
ATTORNEY

Oct. 27, 1953 W. T. WINTRINGHAM 2,657,255

COLOR TELEVISION SYSTEM

Filed May 20, 1950 8 Sheets-Sheet 4

INVENTOR
W. T. WINTRINGHAM
BY Hugh S. Wertz
ATTORNEY

INVENTOR
W. T. WINTRINGHAM
BY Hugh S. Wertz
ATTORNEY

INVENTOR
W. T. WINTRINGHAM
BY Hugh S. Wertz
ATTORNEY

Oct. 27, 1953 W. T. WINTRINGHAM 2,657,255

COLOR TELEVISION SYSTEM

Filed May 20, 1950 8 Sheets-Sheet 7

INVENTOR
W. T. WINTRINGHAM
BY Hugh S. Wertz
ATTORNEY

INVENTOR
W. T. WINTRINGHAM
BY Hugh S. Wertz
ATTORNEY

Patented Oct. 27, 1953 2,657,255

UNITED STATES PATENT OFFICE 2,657,255

COLOR TELEVISION SYSTEM

William T. Wintringham, Chatham, N. J., assignor to Bell Telephone Laboratories, Incorporated, New York, N. Y., a corporation of New York Application May 20, 1950, Serial No. 163,272

7 Claims. (Cl. 178—5.4)

This invention relates to television systems and more particularly to color television systems.

The present invention finds application both with color television transmission systems which are of the so-called "simultaneous" type where each of the three component color images is simultaneously analyzed and transmitted, and additionally it can be modified, in a manner to be described, for use with the so-called "sequential" type where there is a cyclic change between the three components of the color images transmitted.

It is an object of this invention to improve the reproduction of color images in such television systems. More specific objects are, in such systems, to increase the efficiency and sensitivity of the camera pick-up of the object scene and to increase the brilliance and fidelity of the reproduction thereof at the receiver.

For proper understanding of the full scope of the present invention, resort is first necessary to a few principles of colorimetry. It has long been known that a normal observer can duplicate the effect of any color stimulus by mixing the light from three primary stimuli in the proper proportions. The numbers representing the amount of each of the primary stimuli needed to color match the unknown color are known as the tristimulus values. However, in practice, no ternary set of real primaries can be found that will match all colors without employing negative amounts of at least one of the primaries. Therefore, if negative tristimulus values are to be avoided, the primaries to be used must be chosen outside the realm of real colors. The I. C. I. primaries X, Y, and Z which have been adopted by the International Commission on Illumination (I. C. I.) have this characteristic. All the spectrum colors are thereafter defined in terms of three tristimulus values or distribution coefficients $\bar{x}$, $\bar{y}$ and $\bar{z}$, each of which is a measure of the amount of the corresponding I. C. I. primary X, Y or Z required to color-match a unit quantity of radiant energy thereof. The evaluation of the quality of color, or chromaticity, is accomplished by defining three new quantities, x, y and z, derived from the tristimulus values and termed trichromatic coefficients or coordinates, in a manner that their sum is always unity. This latter characteristic permits the convenient representation of chromaticities on a two-dimensional diagram which is called a chromaticity or color diagram. A chromaticity diagram has the important property that if the chromaticity of two distinct colors be plotted, the resultant color of any additive mixture thereof, will always lie on a line connecting the two chromaticities. This also leads to the further property that if the chromaticities of three colors are plotted on a chromaticity diagram, any color whose chromaticity falls within the color triangle having for its vertices the three points plotted, can be formed by additive mixtures of the three colors. Moreover, it is a further characteristic that a color which is defined in terms of tristimulus values corresponding to one ternary set of primaries can be redefined, by means of a linear transformation, by new tristimulus values corresponding to any other ternary set of primaries. For a more complete discussion of colorimetric principles, reference is made to A. C. Hardy's "Handbook of Colorimetry" (1936), The Technology Press, Cambridge, Massachusetts.

A major step in the design of color television systems is the choice of spectral sensitivity characteristics of the camera pick-up for the object scene. Colorimetric considerations indicate that it is desirable that these characteristics represent a linear transformation of the I. C. I. distribution coefficients.

If the spectral response of each of the camera channels, of which there are ordinarily three, since it takes a minimum of three quantities to define a color completely, were proportional to one of the three I. C. I. distribution coefficients, the current in each channel would be proportional to the corresponding tristimulus value for the I. C. I. primaries. However, since it is possible to transform from any one ternary set of primaries to any other ternary set by a linear process, it is unnecessary to achieve this desired result that the shapes of the camera sensitivity curves be made those of the I. C. I. distribution coefficients but rather it is sufficient that any linear transformation of these functions be used. This is fortunate for it is characteristic of photocathode surfaces that uniform performance is not realized over a very large part of the visible spectrum, while both the $\bar{x}$ and the $\bar{y}$ characteristics cover an extended range of wavelengths. This consideration indicates that the most desirable camera characteristics for maximum fidelity are those linear transformations of the I. C. I. distribution coefficients which require response in each camera channel over the smallest possible range of wavelengths.

After sensitivity characteristics of this kind have been derived, these must still be realized at the camera. The over-all camera characteristic is made up of three parts: the spectral distribution of energy of the illuminant; the spectral sensitivity of the camera photo-cathode; and whatever filter characteristics can be used. Proper selection of these components must be made to realize the best approximation of the desired characteristics.

A novel feature of the system of the present invention is the use of camera sensitivity characteristics selected to satisfy this condition of spectral response. This insures the highest fidelity at the camera pick-up.

Moreover, if color television is to be considered as a medium for high fidelity color matching instead of as an entertainment medium, there is little question of the inadequacy of the present three-color systems which hitherto have been more concerned with the problem of producing a pleasing image than that of reproducing a high fidelity facsimile of the original object scene. Colorimetric considerations indicate that a color television system where color fidelity is important should use more than three colors in reproducing the image since it is impossible to match all colors additively with only three colors. Considerable improvement in fidelity of reproduction can be had by the use of additional colors. To this end, the present invention provides for a plurality of colors at the receiver and also provides an arrangement therefor whereby, for any specific color match, the most suitable three thereof are used.

Thus, if the chromaticities of the available primaries at the television receiver are plotted on a chromaticity diagram, the three thereof for the optimum match are those nearest the color to be matched and which form a triangle including the color. The choice is made unique by combining the primary sources at the receiver so that there is no possible overlap of the triangles associated therewith. In the embodiment to be described white is made a vertex of each color triangle. Reference is made to my copending application Serial No. 163,271, filed May 20, 1950, wherein the advantages of the use of a white primary are discussed. It is to be understood, however, that the choice might similiarly have been made unique by the selection of another color as a common primary to all triangles, in a manner to be described hereafter.

For the practice of the present invention, there is also provided an electrical system which can determine in which of a given set of triangles a particular color falls. Further means are provided for utilizing this selection to energize associated primary sources at the receiver.

This system can be used in a direct fashion for multicolor television by the use of a ternary set of color pick-ups associated with each color triangle but this is not feasible since a separate transmission channel would be required for the control of each primary color.

It is another feature of the present invention that though the receiver utilizes more than three color primaries in reproducing the color images of the object scene, only three-color video signals need be received so that three channels are sufficient in the camera pick-up. The necessary expansion is effecuated by use of color coordinate transformers by means whereof the transmitted three-color signals are transformed into a plurality of ternary sets of colorimetrically equivalent signals and selecting means makes the necessary discrimination therebetween to obtain the highest fidelity match.

Moreover, another feature of the invention consists of an arrangement for converting ternary sets of simultaneous color signals into an equivalent ternary set of sequential signals.

In a color television system in accordance with the invention, the aforementioned objects and features are realized and the principles discussed utilized by a system in which: a three-channel camera system whose spectral sensitivity characteristics are those linear transformations of the I. C. I. distribution coefficients which require response in each camera channel over the smallest possible range of wavelengths derives three-color signals of the object scene which are transmitted to a remote receiver unit; the receiver unit receives the transmitted video signals and separates out the three-color components thereof into a ternary set of signals; a plurality of color coordinate transformers transform this one ternary set of color signals into a plurality of ternary sets of colorimetrically equivalent signals; electrical circuits thereafter automatically select therefrom the unique set for the optimum color match; and light sources associated with the selected set produce the desired color match.

The invention will be better understood by reference to the following description taken in connection with the accompanying drawings forming a part thereof, in which:

Fig. 1 is a graph of the I. C. I. distribution coefficients for spectrum colors of indicated wavelengths to help in understanding the principles of the invention;

Figure 1:
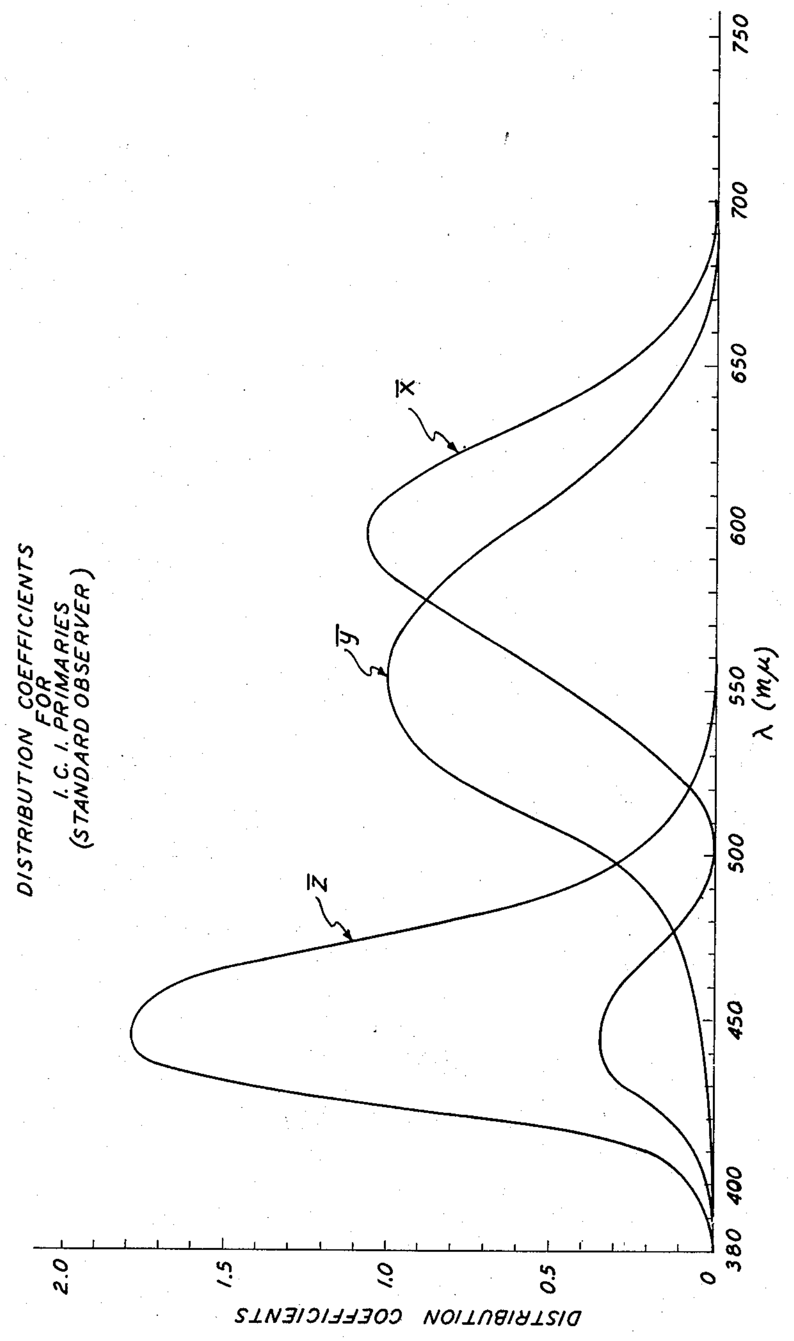

Referring more specifically to the drawings, Fig. 1 illustrates the values of the distribution coefficients $\bar{x}$, $\bar{y}$, and $\bar{z}$, which are the amounts of the three corresponding I. C. I. primaries X, Y, and Z required to color match a unit amount of energy having the indicated wavelength. It may be useful to have in mind some concept of the nature of the I. C. I. primaries. X represents a primary which is a reddish purple of a higher saturation than any obtainable color having this hue. Y represents a green primary considerably more saturated than the spectrum color whose wavelength is 520 millimicrons. Z represents a blue primary considerably more saturated than the spectrum color whose wavelength is 477 millimicrons.

In accordance with one aspect of the invention, the spectral sensitivity characteristics of the camera are the linear transformations of the I. C. I. distribution coefficients which require response in each camera channel over the smallest possible range of wavelengths. The job of finding linear combinations of the I. C. I. distribution coefficients which satisfy these requirements is largely one of trial and error. Essentially, the task is that of assigning values to the coefficients $\bar{a}$, $\bar{b}$ and $\bar{c}$ in the expression:

$$\bar{p} = a\bar{x} + b\bar{y} + c\bar{z}$$

where $\bar{p}$ is the distribution coefficient for one of the new primaries.

Referring to Fig. 1, it is seen that there would be little narrowing of the $\bar{z}$ characteristics by combining it with any fractional part of the $\bar{x}$ and $\bar{y}$ characteristics. It will therefore be assumed that the sensitivity of the camera blue channel is given by $\bar{z}$. It would seem that there is some hope, however, of producing more suitable red and green characteristics by combining I. C. I. distribution coefficients in the proper proportions.

Various approximate solutions are possible which are a function of noise tolerances, the use of separate camera channels for each loop of a particular characteristic, and the mathematical refinements employed.

One such set when noise degradation is disregarded is as follows:

$$\bar{r}=\bar{x}+1.35\bar{y}-0.2162\bar{z}$$
$$\bar{g}=-0.3612\bar{x}+\bar{y}+0.07\bar{z}$$
$$\bar{b}=\bar{z}$$

Another typical solution wherein it is sought to minimize the noise degradation is:

$$\bar{r}=\bar{x}+.5\bar{y}-0.2\bar{z}$$
$$\bar{g}=-0.3612\bar{x}+\bar{y}+0.07\bar{z}$$
$$\bar{b}=\bar{z}$$

A third solution which uses two separate camera channels for producing the two loops in the x characteristic is:

$$\bar{r}=\bar{x}-0.0030\bar{y}-0.0048\bar{z}$$
$$\bar{g}=-0.3612\bar{x}+\bar{y}+0.07\bar{z}$$
$$\bar{b}=\bar{z}$$

There is still the problem of realizing these desirable sensitivity characteristics in a multicolor camera. The over-all camera characteristic is made up of three parts: the spectral distribution of energy of the illuminant; the spectral sensitivity of the photo-cathode and whatever filter characteristic is used.

The characteristics desired for the filters in the camera can be derived from the required sensitivity characteristics and the characteristics of the illuminant and the photo-cathode used. The sensitivity characteristics are equal to the product of three factors; the spectral distribution of energy of the illuminant; the spectral discrimination of the filters; and the spectral sensitivity of the photo-cathode. The filter characteristic necessary, therefore, is given by the quotient of the required sensitivity characteristic by the product of the energy distribution of the illuminant and the spectrum sensitivity of the photo-cathode.

Figure 2:
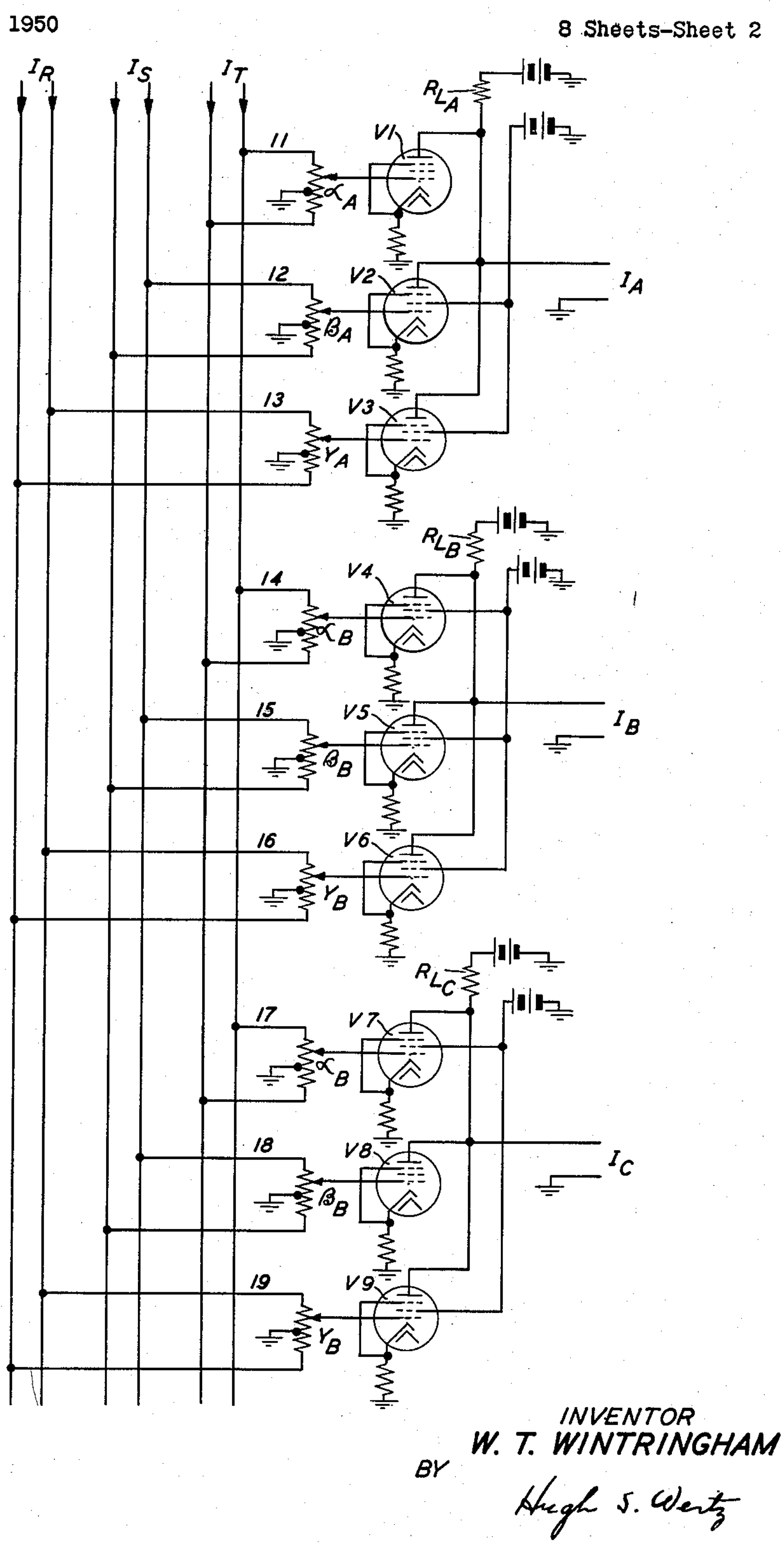
Fig. 2 shows diagrammatically an illustrative circuit arrangement of a color coordinate transformer which is a feature of the invention.

Fig. 2 shows diagrammatically an illustrative electrical arrangement for color coordinate transformation which can be used in the practice of the invention. As is well known in color work, when the three amplitudes of a ternary set of primaries matching a color are known, the three amplitudes of any other ternary set of primaries for a color match can be evaluated by a linear process. If $I_R$, $I_S$, and $I_T$ are a measure of the amounts of primaries R, S, and T needed to match a color $C_1$ and A, B, and C are three other primaries with which it is sought to match the color $C_1$, then the currents $I_A$, $I_B$, and $I_C$ to control these three primaries, respectively, are related to the values $I_R$, $I_S$, and $I_T$ by the linear equations:

$$I_A=k(\alpha_A I_R+\beta_A I_S+\gamma_A I_T) \quad (1)$$
$$I_B=k(\alpha_B I_R+\beta_B I_S+\gamma_B I_T) \quad (2)$$
$$I_C=k(\alpha_C I_R+\beta_C I_S+\gamma_C I_T) \quad (3)$$

The constants $\alpha$, $\beta$ and $\gamma$ depend only on the colors of the new primaries A, B, and C, and are invariable once such primaries have been selected. An illustrative arrangement for performing this transformation of a color from the (R), (S), and (T) system to the (A), (B), and (C) system by electrical means is shown in Fig. 2. Each of the signals $I_R$, $I_S$, $I_T$ supply three potentiometers which are adjusted in accordance with the $\alpha$, $\beta$, and $\gamma$ coefficients of the linear Equations 1, 2 and 3. For example, the current $I_R$ supplies the three potentiometers 11, 14, and 17 which are adjusted to the coefficients $\alpha_A$, $\alpha_B$, and $\alpha_C$ of Equations 1, 2, and 3, respectively. Similarly, the currents $I_S$ and $I_T$ supply potentiometers 12, 15, 18, and 13, 16, 19 adjusted to corresponding $\beta$ and $\gamma$ coefficients. The voltages $\alpha_A I_R$, $\beta_A I_S$, and $\gamma_A I_T$, which are the three components of Equation 1, are supplied to the grids of three pentodes V1, V2, and V3, which are operated as conventional single-stage amplifiers. Addition of the three components in accordance with Equation 1 is effected through the use of a common plate load resistor $R_{L_A}$ for the three amplifier tubes V1, V2, and V3 to produce the current $I_A$. Similar sets of three amplifier tubes V4, V5, and V6 and V7, V8, and V9 operating into common plate load resistors $R_{L_B}$ and $R_{L_C}$, respectively, are used in accordance with Equations 2 and 3 to produce the currents $I_B$ and $I_C$. The arrangement above described is intended as an illustrative embodiment of the principle of color coordinate transformation. Other arrangements are also feasible for the transformation.

Figure 3:
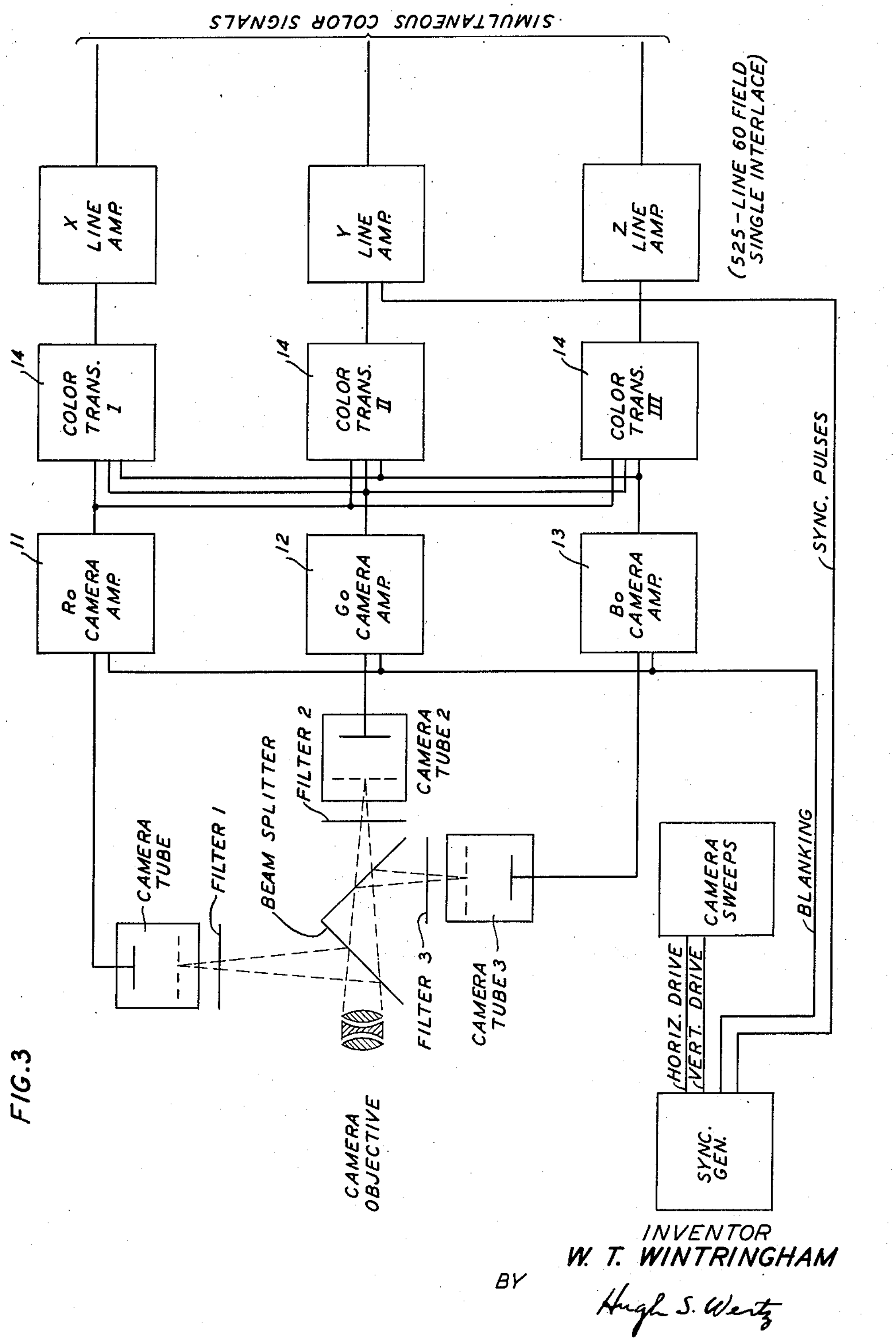
Fig. 3 shows schematically, in block diagram form, an illustrative embodiment of a simultaneous camera, in accordance with one aspect of the invention.

Fig. 3 illustrates a schematic block diagram of a simultaneous type camera in accordance with the invention. The three channels of the camera are shown as three camera tubes 1, 2, and 3, with associated color filters. The characteristics of the photo-cathodes of the camera tube and of the color filters in each channel is selected in accordance with the principles described hereinbefore, so that the spectral sensitivity characteristics of the camera system are the linear transformations of the I. C. I. distribution coefficients which require response in each camera channel over the smallest range of wavelengths. The equivalent camera primaries are designated $R_0$, $G_0$, and $B_0$, corresponding to the tristimulus values $\bar{r}$, $\bar{g}$, and $\bar{b}$ derived hereinbefore. Each camera signal is amplified by its associated amplifying channel. Since these primaries are not necessarily the most suitable for transmission to the receiver, provision is made for color coordinate transformation to the most desirable set therefor. For the purpose of illustration, it is assumed that line currents corresponding to I. C. I. color coordinates are suitable for transmission. A color coordinate transformer 14 of the kind shown in Fig. 2, therefore, is used to convert the outputs of the respective camera amplifiers 11, 12, and 13, from a ($R_0$) ($G_0$) ($B_0$) system to an I. C. I. system. The outputs from the respective generators of the color coordinate transformers, therefore, are labelled X, Y, and Z to indicate I. C. I. primaries. In accordance with the practice well known in the art, synchronizing pulses are transmitted in one channel of the three required for the color signals. Also, in all other respects, the operation is in the manner well known in the art.

As an alternative arrangement, if a sequential type system be preferred, a sequential color camera, of the kind well known in the art, can be used. However, for the purpose of high quality color transmission and in accordance with the invention, the camera spectral sensitivity in this case should be the same as for the simultaneous camera described hereinabove.

It was suggested above that the currents corresponding to the camera primaries $R_0$, $G_0$, and $B_0$ may not be the most suitable for transmission. However, it is a difficult matter to affect color coordinate transformation with sequential color signals. For that reason it may be desirable to generate and transform simultaneous color signals with a simultaneous camera of the type shown in Fig. 3, and thereafter these color signals can be converted into sequential color signals.

Figure 4:
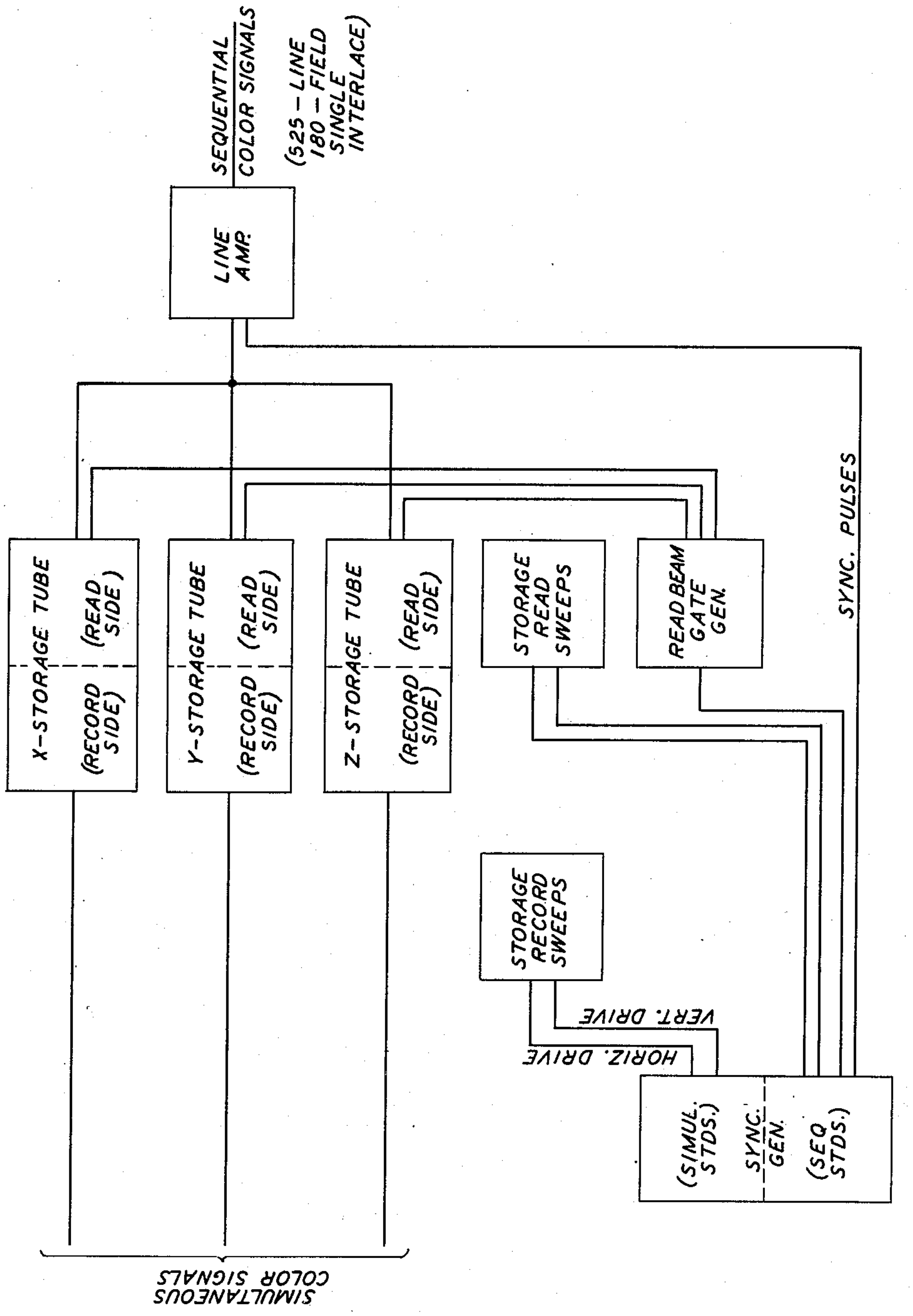
Figs. 4 and 5 show schematically, in block diagram form, a typical arrangement for converting simultaneous color signals to sequential signals and a typical arrangement for converting sequential color signals to simultaneous signals, respectively, both of which can be used in the practice of the invention when sequential color signals are to be transmitted.

An illustrative arrangement for the conversion from simultaneous to sequential signals by the use of storing devices, which, for example, are here shown as storage tubes, is shown in Fig. 4. The operation of this arrangement is straightforward. The simultaneous color signals are recorded on the storage surfaces of three storage tubes. The sequential signals are taken from these records and the records erased, by scanning the three records in turn.

If the storage devices are perfect in the sense that there is no interaction between the recording and reading some freedom between recording field rates and reading field rates can be gained. In particular, it is possible to read from each of the three tubes, in turn, during the time recording is being carried out. That is, for a field sequential system, the field rate of the sequential signals may be three times the simultaneous field rate.

If there is some interaction between the recording and reading process in the storage tube, this freedom is not permissible. Instead, the sequential and the simultaneous field rates must be equal. Under this condition, the reading beam will follow the recording beam in any one tube with a delay of approximately one-half field. The sequential signals in this case will represent the sum of simultaneous signal corresponding to three scannings of the picture field. Other arrangements for the conversion will be apparent to workers in the art.

The color coordinate transformations described heerinbefore with reference to Fig. 2, can be carried out only when the color signals corresponding to a signal color image are available simultaneously. The multicolor receivers of the present invention, therefore, can operate only from simultaneous color signals. If for transmission performance, it is desirable to transmit color signals sequentially, a conversion from sequential to simultaneous signals must be carried out at the receiver.

Figure 5:
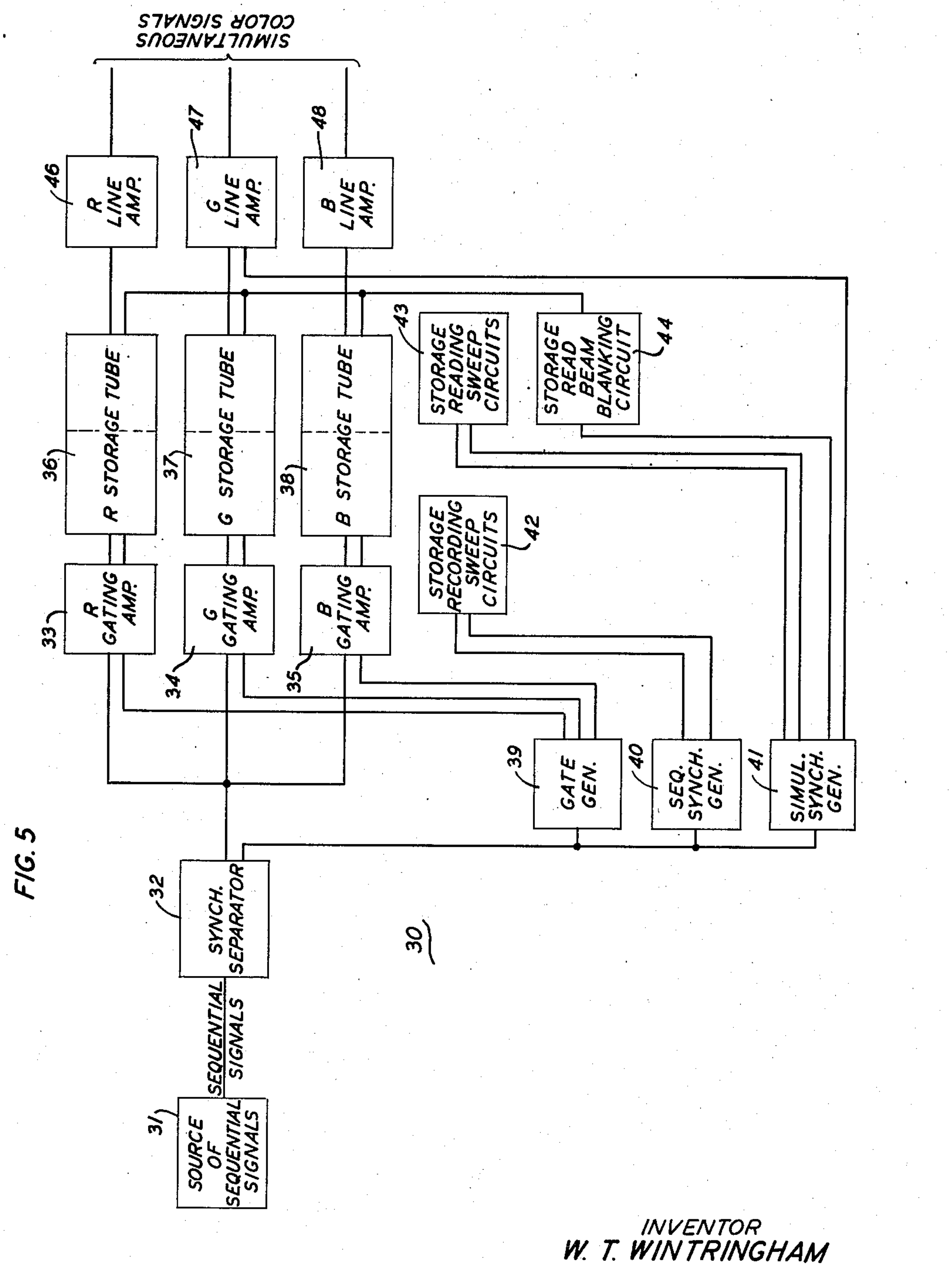

Fig. 5 shows in block schematic form an illustrative arrangement 30 for converting sequential type signals into simultaneous signals for use with color coordinate transformers. Since in a sequential system the signals for each of the three primaries are transmitted cyclically at successive times, an obvious expedient for obtaining simultaneous signals therefrom is by introduction of delay. This is the technique used in the arrangement 30 where storing devices, as for example, storage tubes, are utilized to produce the necessary delay. A typical storage tube which can be adapted for use herein is described in the R. C. A. Review, volume IX, page 112 (1948), "Barrier Grid Storage Tube and its Operation." The sequential signals, which for purposes of illustration will be described as composed of (R), (G) and (B) components, respectively, are supplied from a source 31, through the synchronizing separator 32 to three gating amplifiers 33, 34, and 35, associated with the (R), (G), and (B) output signal channels, respectively. These supply corresponding storage devices, which are described here, for example, as storage tubes 36, 37, and 38, respectively. The synchronizing separator 32 of the kind well known in the art also furnishes necessary synchronizing pulses to the gating generator 39, the sequential synchronizing generator 40, and the simultaneous synchronizing generator 41. The gating generator 39 supplies the necessary gating pulses to the gating amplifiers 33, 34, and 35 so as to distribute the (R), (G), and (B) component signals to their corresponding storage devices 36, 37, and 38, respectively. The sequential synchronizing generator 40 furnishes the storage recording sweep circuits 42 with synchronizing pulses to insure the proper synchronization of the recording cycle of the storage process. Similarly the simultaneous synchronizing generator 41 drives the storage circuits 43 to provide proper synchronization in the reading cycle and also provides signals to the storage reading beam blanking circuit 44 which supplies blanking pulses to the reading beams of the storage devices 36, 37 and 38 to insure the simultaneity of the reading. Each of the storage devices 36, 37, and 38 is connected to its associated line amplifier 46, 47, and 48 corresponding to the (R), (G), and (B) components, respectively. The synchronizing pulses for the simultaneous set are supplied to the (G) component in its associated amplifier 47 from the simultaneous synchronizing generator 41. The three outputs of the amplifiers 46, 47, and 48 then represent simultaneous color signals which are facsimiles of the sequential signals supplied from the source 31 after separation, and are now adaptable for utilization by color coordinate transformers in the manner hereinbefore described, in accordance with the invention.

If the storage devices are storage tubes and are perfect in the sense that there is no interaction between the recording and reading, the simultaneous reading may occupy the same time that is required to write all three color signals sequentially. This means that the simultaneous field rate can be one-third the sequential field rate. If such perfection is not possible, the simultaneous reading rate must be about the same as the sequential recording rate, or the time required to read all the three simultaneous color signals must be approximately the time required to record one sequential color signal. This latter type of operation requires that the recorded signal be reread a total of three times from each record, before the record is erased. Alternatively, a system can be devised in which simultaneous color signals are available for one-third of the time, and during the remaining two-thirds no color information is available. Other arrangements for transformation from the sequential to simultaneous signals which will be apparent to workers skilled in the art, can be utilized in accordance with the invention.

Figure 6:
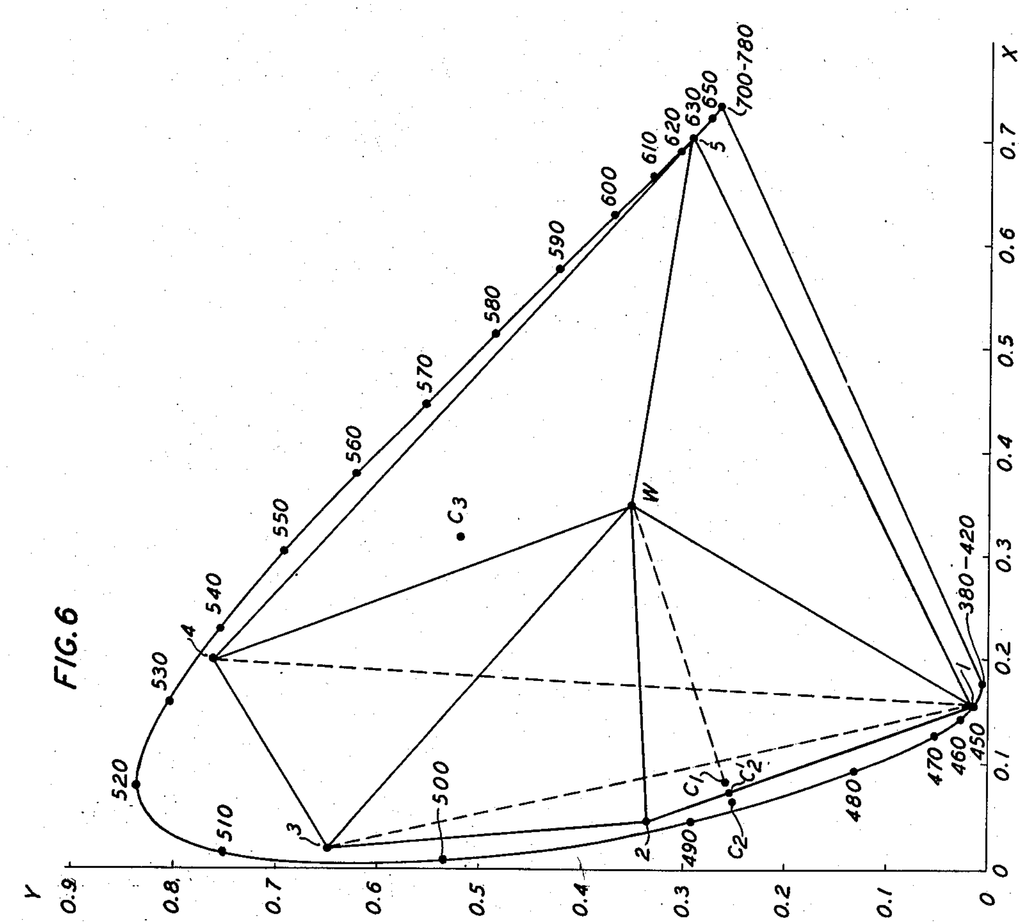
Fig. 6 shows a chromaticity diagram to aid in describing the invention.

Fig. 6 is a color or chromaticity diagram which will be useful in the description of the invention. A chromaticity diagram has the useful property that if the coordinates of three primaries be plotted thereon, any color whose coordinates lie within the triangle having for its vertices the three points plotted can be formed by an additive mixture of the three primaries, and also that any color whose coordinates are not so contained cannot be formed thereby, since it is impossible to provide a negative amount of light. By way of example, for purposes of illustration, hereinafter there will be described a receiver which utilizes six primaries, five different colors and a white. The coordinates of the primaries 1, 2, 3, 4, 5, and W, the white, available at the receiver, have been plotted and the five triangles, 1—2—W, 2—3—W, 3—4—W, 4—5—W, and 5—1—W, have been formed. W, the white primary, is common to all the triangles. For each triangle formed, there is associated therewith, a color coordinate transformer, of the kind hereinabove described. Each of these transformers converts the transmitted signals into a corresponding ternary set of colorimetrically equivalent signals in terms of amounts of the associated primaries.

It should be apparent that there is no limitation on the number of primaries that could be used at the receiver. Six have been used here, by way of example for purposes of illustration. Moreover, it is also unnecessary that the triangles be formed as illustrated. In special cases, it may be preferable to use a low saturation primary other than white as a common vertex, or it is even possible to use therefor a highly saturated primary, such as 1, and form triangles 1—2—3, 1—3—4, and 1—4—5. However, it is desirable, so as to minimize the complexity of the selecting means, that there be no overlapping in the triangles formed. Geometric considerations indicate also that it is desirable to have one vertex common to all triangles.

In the case where the coordinates of the color $C_1$ which is being transmitted lie within the triangle 1—2—W, the three signals from the color transformer associated therewith will all be positive since an additive match is possible. Moreover, for the other triangles shown, there will be at least one negative signal since an additive match is impossible. The important fact here is that all three signals are positive only at the output of the color transformer corresponding to the triangle 1—2—W within which the color $C_1$ lies, and at least one signal is negative in every other triangle. This fact is utilized to select electrically the optimum match.

Also with reference to Fig. 6, suppose the color $C_2$ having coordinates which fall outside all the color triangles corresponding to the sets of primaries available at the receiver. Then at least one signal in each of the associated color transformers will be negative since an additive match is impossible. In this special case, the electrical mechanism should be such that the primaries 1 and 2 are turned on to produce the color $C_2'$ corresponding to zero amplitude of primary W. In the cases here illustrated, the distinction of polarities between colors $C_1$ and $C_2$ is that the output $L_W$ of the associated transformer 1—2—W corresponding to the primary W is positive and negative, respectively. In no case is the polarity of the W output of any transformer negative except when the color is outside all the triangles. In the latter case, moreover, it is negative only at the output of one transformer, and the other two outputs of this same transformer are positive. Therefore, it is necessary that the selecting circuits used should not be controlled by the polarity of the W outputs. Since the light source of primary W can never produce a negative output, the color match is unaffected by a negative W signal.

Figure 7:
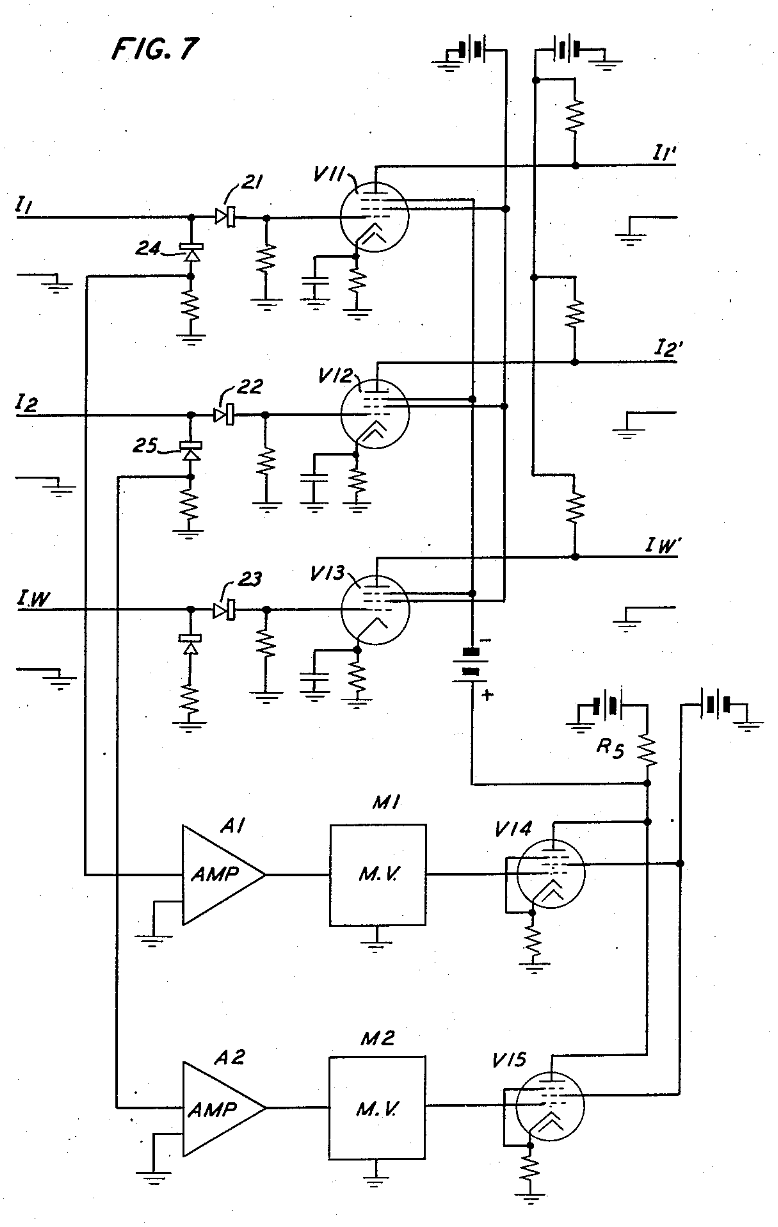
Fig. 7 shows partly diagrammatically and partly in block schematic form a selecting circuit which can be used in the practice of the invention.

Fig. 7 illustrates partly in block schematic form and partly diagrammatically an illustrative embodiment of a selecting, or disabling circuit which automatically selects the output of the particular color transformer that gives the best match. In accordance with the invention, as was hereinbefore described, the color transformers each produce a ternary set of signals which is the colorimetric equivalent of the color being matched. However, the desired set is characterized by the fact that its two outputs, exclusive of the W output, are positive. The selecting circuit must automatically discriminate between the available sets by this characteristic. In the illustrative embodiment shown, a gating amplifier, with the gating control applied to the suppressor grid of a pentode tube, is inserted in each circuit associated with one of the three separate outputs of each color transformer. For the sake of illustration the ternary set $I_1$, $I_2$, and $I_W$ associated with the color transformer for triangle 1—2—W has been chosen. The gating amplifiers are shown as the pentodes V11, V12, and V13, whose control grids are supplied with signals $I_1$, $I_2$, and $I_W$, respectively. The pentodes V11, V12, and V13 are operated as gating amplifiers, in a manner well known to the art. Series rectifiers 21, 22 and 23, poled to pass only positive signals, are inserted in the input circuits of the three gating amplifiers V11, V12, and V13, respectively. The input signals $I_1$ and $I_2$ are also supplied to amplifiers A1 and A2, respectively. The rectifiers 24 and 25 are inserted in the input circuits of A1 and A2, respectively, and are poled to pass only negative signals. The amplifiers A1 and A2 can be of any conventional design, adapted to receive negative input signals. The outputs of the two amplifiers A1 and A2 are supplied to multivibrators M1 and M2, respectively. These multivibrators have one position of stability, and produce a sharp positive pulse when triggered by a negative input but return to a stable position immediately after the signal is removed. There are many arrangements known in the art for producing this desired effect. The multivibrators thereafter supply the input circuits of the isolating amplifiers V14 and V15, which are pentodes operated, in a manner well known in the art, for adding the outputs of the two multivibrators M1 and M2 by means of a common load resistor in the plate circuits. The control voltage which is developed at the common plate load R5 of tubes V14 and V15 is applied to the suppressor grid of each of the tubes V11, V12, and V13.

The operation of this selecting circuit is as follows. First, suppose that the color $C_1$ shown in Fig. 2, whose coordinates lie within the color triangle 1—2—W is being transmitted. Then as described hereinbefore the outputs $I_1$, $I_2$, and $I_W$ of the color transformer associated therewith are all positive. Since rectifiers 24 and 25 are poled to pass only negative signals, the control circuits comprising the amplifiers A1 and A2 are inoperative, since no signal is supplied thereto. Tubes V11, V12, and V13, in the absence of gating pulses on the suppressor grids thereof, function as conventional amplifiers to provide the outputs $I_1'$, $I_2'$, and $I_W'$ which are utilized to actuate associated light sources. The above description is also applicable for the case of color $C_2$ of Fig. 2 corresponding to the case when $I_W$ is negative, except that the gating amplifier V13 will receive no input signals because of the blocking effect of the rectifier 23 which is poled to pass only positive signals. However, for the color $C_3$ shown in Fig. 2, which lies in the triangle 2—3—W, the signal $I_1$ from the color transformer for triangle 1—2—W will be negative indicating that an additive match is impossible with the primaries 1, 2, and W. This negative signal is supplied through the rectifier 24 to the amplifier A1, and the amplified output thereof in turn trips the multivibrator M1, which action produces a positive step voltage therefrom which is thereafter reversed by the isolating amplifier V14. This negative pulse is then applied to the suppressor grids of each of the gating amplifiers V11, V12, and V13, and keeps each one unresponsive to all input signals so long as the output $I_1$ is negative. An arrangement of the kind described is associated with the outputs of each color transformer to act as a disabling mechanism if either of the outputs thereof, exclusive of the W output, is negative. The particular arrangement which is described is merely illustrative of one possible type of selecting means. One skilled in the art can easily devise others to achieve the desired disabling.

Figure 8:
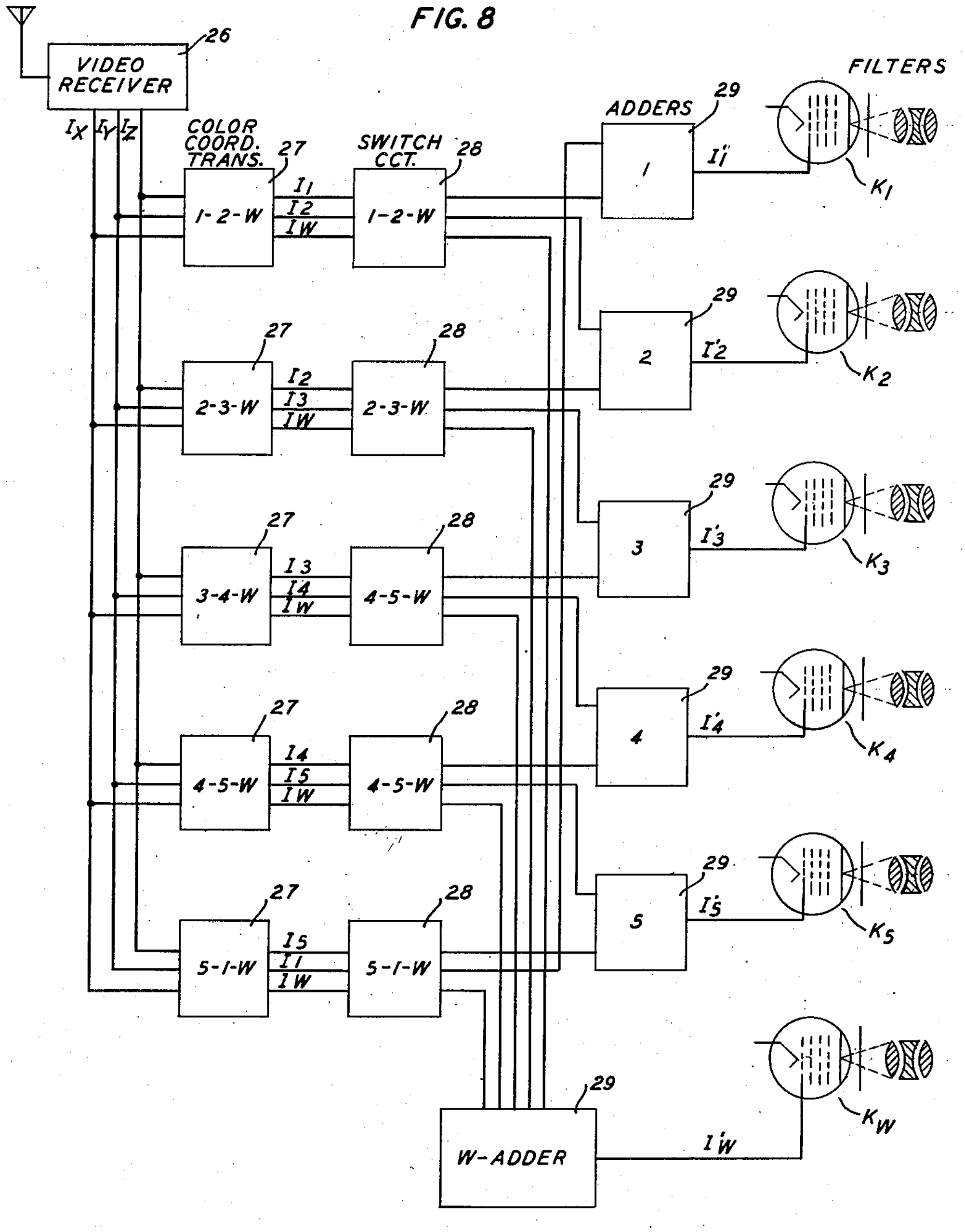
Fig. 8 shows, in block schematic form, a multicolor receiver in accordance with the invention.

Fig. 8 shows in block schematic form an illustrative embodiment of a color television receiver which utilizes five different colors and a white as primaries in accordance with the invention. The video amplifier 26 receives the tranmsitted video signals and supplies therefrom the ternary set of signals $I_X$, $I_Y$, and $I_Z$ representing the color C in the I. C. I. system to each of the plurality of color transformers 27, of the kind described. It is here assumed that I. C. I. primary signals are being transmitted though it will be apparent that this receiver can be adapted to receive color signals of any ternary set of primaries. Each transformer 27 is associated with a ternary set of primaries at the receiver and has three characteristic color outputs corresponding to its three associated primaries. As was described hereinbefore, the white primary is made common to each transformer. Associated with each color transformer 27, is a corresponding disabling or selecting circuit 28 to render ineffective all of the outputs of any transformer of which either of the two outputs thereof, exclusive of the white, is negative. As was hereinabove discussed, it is a characteristic of this color transformation, that the ternary set for the optimum match is the only one not rendered ineffective by its associated disabling circuit. The separate outputs of every disabling circuit are supplied to corresponding adding circuits A to be described. Each adder 29 is adapted to add the separate outputs corresponding to its associated primary source. Thereafter, the output of each adder is supplied to the control grid of an associated kinescope. These serve as the primary light sources. Filters are then used with these kinescopes, in a manner known in the art, to obtain the desired 1, 2, 3, 4, 5, and W colors, which are mixed to produce facsimiles of the color images transmitted.

Figure 9:
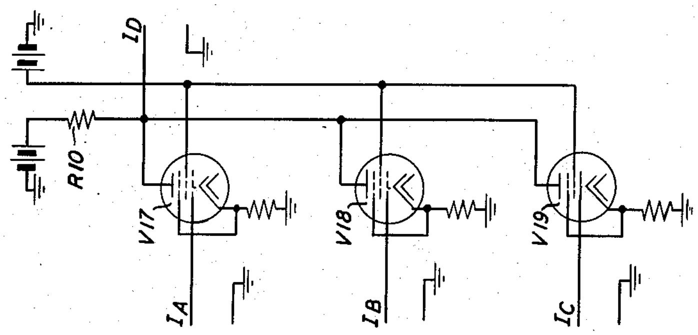
Fig. 9 shows an illustrative arrangement for adding outputs which can be used in the practice of the invention.

Fig. 9 shows diagrammatically a simple illustrative adding circuit of the kind shown in block schematic in the arrangement of Fig. 4, which can be utilized to add the several outputs corresponding to the same primary into a single signal for supplying the associated kinescope. The signals $I_1$, $I_2$ and $I_3$ to be added are supplied to the control grids of separate pentodes V17, V18, and V19, respectively, which are operated as conventional amplifiers. The outputs thereof are combined to form an output $I_4$ by means of a load resistor $R_{10}$ common to the plate circuits of tubes V17, V18, and V19. This arrangement is merely illustrative of the adding principle, additional refinements are necessary in a practical system.

As was mentioned hereinbefore it may be desirable to transmit color signals of the sequential kind. In this case, the sequential signals must first be converted to simultaneous signals for use with the color coordinate transformers. The arrangement hereinbefore described with reference to Fig. 5 can be used for this purpose.

It is to be understood that the above-described circuit arrangements are illustrative of the principles of the invention. Numerous other circuits can be devised to effect the desired functions by one skilled in the art without departing from the spirit and scope of the invention.

What is claimed is:

1. In a television receiver for producing color images from a ternary set of transmitted color television signals, a plurality exceeding three of light sources of different colors, means for producing a ternary set of video signals, a plurality of color coordinate transformers for transforming the received ternary set into a plurality of colorimetrically equivalent ternary sets, each equivalent ternary set controlling a different ternary combination of said different color light sources, electrical circuit means for selecting from the plurality of ternary sets one ternary set, and means for utilizing the selected ternary set for energizing the light sources of the controlled ternary combination.

2. In a color television receiver, a plurality exceeding three of light sources of different colors, means for receiving a ternary set of color television signals, a plurality of color coordinate transformers for transforming the received ternary set into a plurality of colorimetrically equivalent ternary sets, each equivalent ternary set controlling a different ternary combination of the light sources, polarity sensitive circuit means for selecting one set from the plurality of ternary sets, and means for utilizing the selected set for energizing the controlled ternary combination of light sources.

3. In a color television receiver, a plurality exceeding three of light sources, means for receiving a ternary set of color television signals, a plurality of color coordinate transformers for transforming the received ternary set into a plurality of colorimetrically equivalent ternary sets, each equivalent set determining amounts of light necessary from individual sources of a different ternary combination of the light sources to color match the color represented by the input ternary set, polarity sensitive circuit means for selecting from the plurality of equivalent ternary sets, a ternary set corresponding to an additive match of the corresponding ternary combination of light sources, and means for utilizing the selected ternary set for energizing the corresponding ternary combination of light sources.

4. In a color television receiver, means for receiving an input ternary set of color signals, at least four light sorces, a plurality of color coordinate transformers for transforming the input ternary set into a plurality of colorimetrically equivalent ternary sets, each equivalent ternary set controlling a different group of at least three light sources, a plurality of polarity detectors for selecting from the plurality of ternary sets a ternary set characteristic of an additive match, and means for utilizing the selected ternary set for energizing the light sorces forming the group controlled thereby.

5. In a color television system, at the transmitting terminal, three cameras forming three channels for deriving a ternary set of color signals representative of a picture scene, and means for transmitting said ternary set of color signals to a receiving terminal, and, at the receiving terminal, means for receiving said ternary set of color signals, a plurality exceeding three of light sources, a plurality of color coordinate transformers for transforming the received ternary set of color signals into a plurality of colorimetrically equivalent ternary sets, each equivalent ternary set controlling a different group of said light sources, electrical circuit means for selecting from the plurality of equivalent ternary sets one ternary set, and means for utilizing the selected ternary set of color signals for energizing the light sources of the controlled group.

6. In a color television system, at the transmitter, three cameras forming three channels for deriving a ternary set of color signals representative of a picture scene, and means for transmitting said ternary set of color signals to a receiving terminal, and at the receiving terminal, means for receiving said ternary set of color signals, a plurality exceeding three of light sources, a plurality of color coordinate transformers for transforming the received ternary set of color signals into a plurality of colorimetrically equivalent sets, each equivalent ternary set associated with a group of said light sources, polarity sensitive circuit means for selecting one from the purality of equivalent ternary sets, and means for utilizing the selected ternary set for energizing its associated group of light sources.

7. A television system for reproducing a picture scene in color comprising means for deriving for successive elements of the picture scene a ternary set of color signals, means for transmitting the successive ternary sets of signals to a receiving point, means for receiving the successive ternary sets of color signals, means for transforming each received ternary set of color signals into a plurality of colorimetrically equivalent ternary sets of color signals, means for selecting from the plurality of colorimetrically equivalent sets one representative of an additive color match, and means for utilizing the selected ternary set for reproducing successive elements of the picture scene.

WILLIAM T. WINTRINGHAM.

References Cited in the file of this patent

UNITED STATES PATENTS

| Number | Name | Date |
|---|---|---|
| 2,253,292 | Goldsmith | Aug. 19, 1941 |
| 2,333,969 | Alexanderson | Nov. 9, 1943 |
| 2,415,051 | Thompson | Jan. 28, 1947 |
| 2,434,561 | Hardy | Jan. 13, 1948 |
| 2,492,926 | Valensi | Dec. 27, 1949 |
| 2,509,038 | Goldsmith | May 23, 1950 |
| 2,558,489 | Kalfaian | June 26, 1951 |